US012780016B2

(12) United States Patent
Gonzalez Santini et al.

(10) Patent No.: US 12,780,016 B2
(45) Date of Patent: Nov. 3, 2026

(54) DISTRIBUTED HIGH VOLTAGE BUS AND HYBRID RECHARGEABLE ENERGY STORAGE SYSTEM ARCHITECTURE FOR ELECTRIFIED VEHICLES

(71) Applicant: GM GLOBAL TECHNOLOGY OPERATIONS LLC, Detroit, MI (US)

(72) Inventors: Nomar S. Gonzalez Santini, Lakeland, FL (US); Jaideep Singh, West Bloomfield, MI (US); Armando Antonio Beltran Pacheco, Rochester Hills, MI (US); Azeem Sarwar, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/187,086

(22) Filed: Apr. 23, 2025

(65) Prior Publication Data

US 2026/0336431 A1 Oct. 29, 2026

(51) Int. Cl.
*B60L 50/64* (2019.01)
*H02J 7/00* (2026.01)
(Continued)

(52) U.S. Cl.
CPC ................ *B60L 50/64* (2019.02); *H02J 7/50* (2026.01); *H02J 7/855* (2026.01); *H02J 2105/37* (2026.01)

(58) Field of Classification Search
CPC ... B60L 50/64; H02J 7/50; H02J 7/855; H02J 2105/37
See application file for complete search history.

(56) References Cited

U.S. PATENT DOCUMENTS

2009/0115375 A1* 5/2009 Iida ......................... B60L 50/16 320/109
2011/0187184 A1* 8/2011 Ichikawa ................ B60L 55/00 307/10.1
2012/0123625 A1* 5/2012 Ueo ........................ B60L 50/16 701/22

FOREIGN PATENT DOCUMENTS

DE 102021100553 A1 8/2021
DE 102016225108 B4 9/2024
(Continued)

OTHER PUBLICATIONS

German Office Action from counterpart DE1020251320926, dated Feb. 6, 2026.
(Continued)

*Primary Examiner* — Carlos Amaya

(57) ABSTRACT

A system includes a first HV bus including first and second conductors, a first RESS connected between the first and second conductors, and a first load connected between the first and second conductors. A second HV bus includes third and fourth conductors, a second RESS connected between the third and fourth conductors, and a second load connected between the third and fourth conductors. An onboard charging module (OBCM) at least one of charges the first RESS and the second RESS using an alternating current source and supplies power to an external load. A first power inverter module (PIM) is configured to output power from at least one of the first and second RESS to at least one of M electric motors. A second power inverter module (PIM) configured to output power from at least one of the first and second RESS to the at least one of M electric motors.

19 Claims, 11 Drawing Sheets

(51) Int. Cl.
*H02J 7/50* (2026.01)
*H02J 105/37* (2026.01)

(56) References Cited

FOREIGN PATENT DOCUMENTS

| | | | |
|---|---|---|---|
| DE | 102024109502 | A1 | 12/2024 |
| DE | 102023206271 | A1 | 1/2025 |
| DE | 102023128167 | A1 | 2/2025 |
| DE | 102023125355 | A1 | 3/2025 |
| DE | 112023004295 | T5 | 8/2025 |

OTHER PUBLICATIONS

German Office Action from counterpart DE1020251228922, dated Feb. 11, 2026.

* cited by examiner

8/11

DISTRIBUTED HIGH VOLTAGE BUS AND HYBRID RECHARGEABLE ENERGY STORAGE SYSTEM ARCHITECTURE FOR ELECTRIFIED VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to high voltage bus and rechargeable energy storage system (RESS) architectures for electric vehicles.

Electrified vehicles (EVs) such as battery electric vehicles (BEVs), hybrid vehicles, and/or fuel cell vehicles include one or more electric machines and a rechargeable energy storage system (RESS) including one or more battery cells, modules, and/or packs. A power control system is used to control charging and/or discharging of the battery system during charging and/or driving.

SUMMARY

A distributed high voltage bus and hybrid rechargeable energy storage (RESS) system includes a first HV bus including first and second conductors, a first rechargeable energy storage system (RESS) connected between the first and second conductors, and a first load connected between the first and second conductors. A second HV bus includes third and fourth conductors, a second RESS connected between the third and fourth conductors, and a second load connected between the third and fourth conductors. An onboard charging module (OBCM) is configured to at least one of charge at least one of the first RESS and the second RESS using an alternating current source and supply power from at least one of the first RESS and the second RESS to an external load. A first power inverter module (PIMS) configured to output power from at least one of the first and second RESS to at least one of M electric motors where M is an integer great than zero. A second power inverter module (PIMS) configured to output power from at least one of the first and second RESS to the at least one of M electric motors.

In other features, a first switch is connected in series with the first conductor. A second switch is connected between the second conductor and the third conductor. A third switch connected in series with the fourth conductor.

In other features, a switch box including a plurality of switches configured to connect at least one of the first RESS and the second RESS with a direct current fast charging (DCFC) station. The first RESS operates at a different voltage than the second RESS. The first RESS operates uses battery cells using a different chemistry than battery cells of the second RESS. At least one of the first load and the second load includes an air conditioning (AC) electric compressor (ACEC). At least one of the first load and the second load includes an electric heater. At least one of the first load and the second load includes an auxiliary power module (APM).

In other features, the switch box is located in a vehicle. The switch box is located outside of a vehicle.

In other features, the onboard charging module (OBCM) includes a first OBCM configured to charge the first RESS and a second OBCM configured to charge the second RESS using the AC source.

In other features, the onboard charging module (OBCM) includes a first OBCM configured to charge the first RESS and a second OBCM configured to charge the second RESS using the alternating current source. The first OBCM and the second OBCM are bidirectional and are configured to rebalance energy stored in the first RESS and the second RESS at least one of prior to or during DCFC at the DCFC station.

A distributed high voltage bus and hybrid rechargeable energy storage device (RESS) system includes a first HV bus comprising first and second conductors, a first rechargeable energy storage system (RESS) connected between the first and second conductors, and a first load connected between the first and second conductors. A second HV bus includes third and fourth conductors, a second RESS connected between the third and fourth conductors, and a second load connected between the third and fourth conductors, wherein the first RESS operates at a different voltage than the second RESS. An onboard charging module (OBCM) is configured to charge the first RESS and the second RESS using an alternating current (AC) source. A first power inverter module (PIMS) is configured to output power from at least one of the first and second RESS to a first motor. A second power inverter module (PIMS) is configured to output power from at least one of the first and second RESS to a second motor. A first switch is connected in series with the first conductor. A second switch is connected between the second conductor and the third conductor. A third switch is connected in series with the fourth conductor.

In other features, a switch box includes a plurality of switches configured to connect at least one of the first RESS and the second RESS to a direct current fast charging (DCFC) station. The first RESS includes battery cells using a different chemistry than battery cells of the second RESS.

In other features, at least one of the first load and the second load includes a load selected from a group consisting of an air conditioning (AC) electric compressor (ACEC), an electric heater, and an auxiliary power module (APM). The switch box is located in a vehicle. The switch box is located outside of a vehicle. The onboard charging module (OBCM) includes a first OBCM configured to charge the first RESS and a second OBCM configured to charge the second RESS using the AC source.

A vehicle includes M electric motors, where M is an integer greater than zero. A distributed high voltage bus and hybrid rechargeable energy storage device (RESS) system includes a first HV bus comprising first and second conductors, a first rechargeable energy storage system (RESS) connected between the first and second conductors, and a first load connected between the first and second conductors. A second HV bus includes third and fourth conductors, a second RESS connected between the third and fourth conductors, and a second load connected between the third and fourth conductors, wherein the first RESS operates at a different voltage than the second RESS. An onboard charging module (OBCM) is configured to charge the first RESS and the second RESS using an alternating current (AC) source. A first power inverter module (PIMS) is configured to output power from at least one of the first and second RESS to one of the M electric motors. A second power inverter module (PIMS) is configured to output power from at least one of the first and second RESS one of the M electric motors. A first switch is connected in series with the first conductor, a second switch is connected between the second conductor and the third conductor. A third switch is connected in series with the fourth conductor. A switch box includes a plurality of switches configured to connect at least one of the first RESS and the second RESS to a direct current fast charging (DCFC) station.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An electric vehicle (EV) include a single bus with two or more rechargeable energy storage systems (RESS) operating at a high voltage (HV) (e.g., 400V). Since the RESS are connected across the same HV bus, the two or more RESS typically use the same battery chemistry and operate at the same voltage level.

In some examples, the two or more RESS can be connected in series between supply and reference HV bus conductors. In other examples, the two or more RESS are connected in parallel between the first and second HV bus conductors. In some examples, a DC-DC converter is connected to the two or more parallel-connected RESS to step up the voltage from one voltage level to another (e.g., from 400V to 800V) to power higher voltage loads (e.g., 800V loads such as an auxiliary power module (APM)).

For example, during 400V direct current fast charging (DCFC) when using an 800V architecture, the 800V loads (such as an 800V auxiliary power module (APM)) may be unable to operate. Since the APM is not operating, devices associated with the APM are unable to power one or more controllers, which may adversely impact vehicle operation. In addition, loads such as electric heaters may derate which adversely impacts cold weather charging and customer satisfaction. Possible solutions include adding a 400V to 800V converter which adds cost and has adverse packaging implications. Utilizing a power inverter and motor as boost converter adds cost, involves complex software, and has adverse packaging implications. Increasing a voltage operating range of the APMs (e.g., from ~400V to ~800V) is inefficient and costly.

A distributed high voltage (HV) bus and rechargeable energy storage system (RESS) hybrid architecture according to the present disclosure includes two or more HV buses and two or more RESS. More particularly, the number of HB buses that can be formed is equal to $2^R-1$, where R is the number of independent RESS. Using two or more HV buses allows the HV buses to operate at different voltages which may be advantageous for some types of loads. However, the same voltages can also be used. Using two or more HV buses also enables the use of RESS including battery cells with different battery chemistries. However, the same battery chemistry can also be used.

The architecture described herein enhances efficiency and performance by enabling HV components to operate at a voltage level that is optimum for the particular(s) HV component(s). When one of the RESS has a fault, the architecture described herein reconfigures to enable operation with reduced performance using onboard charging modules. In some examples, the architecture described herein enables direct current (DC) fast charging (DCFC) of each RESS (e.g., multi-port charging) to significantly reduce charging time. The architecture described herein can be connected to a modular switch box implemented either in the vehicle or separately. The switch box can be used to enable different charging functionality.

Figure 1:
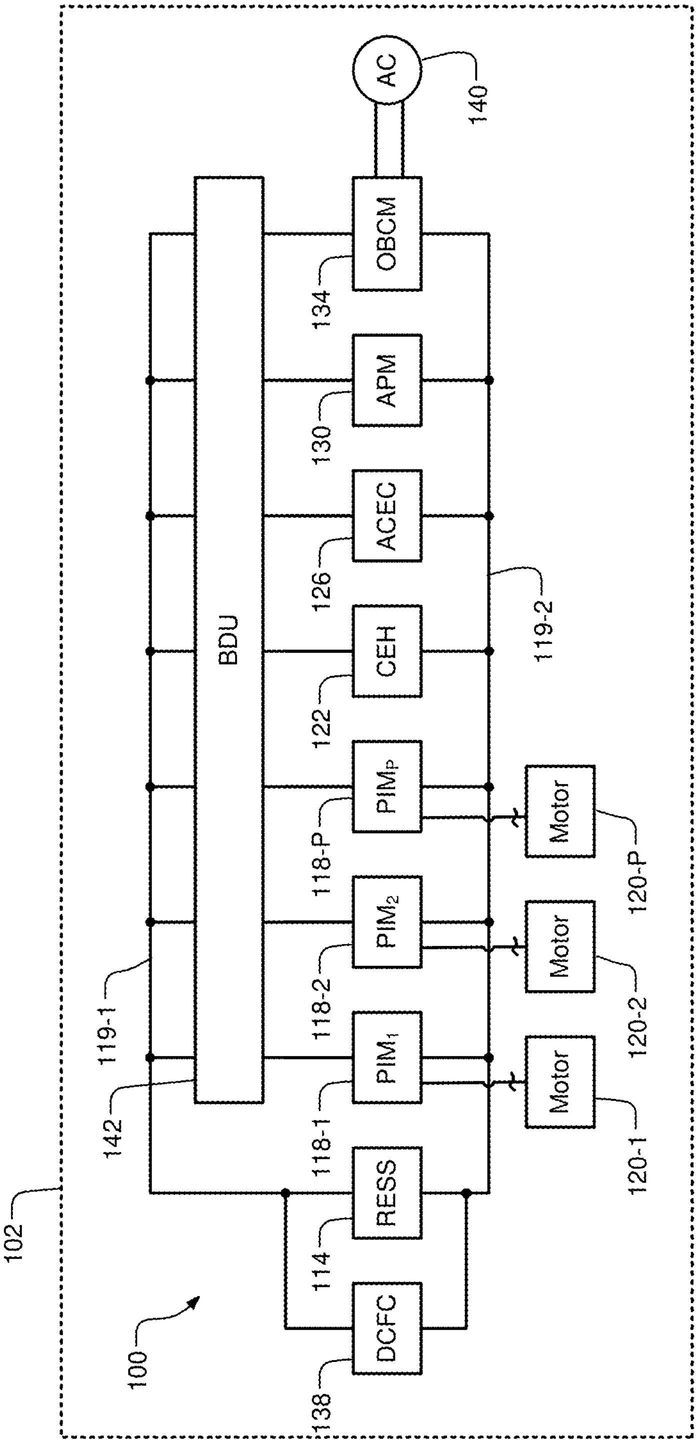
FIG. 1 is a functional block diagram of a high voltage bus and rechargeable energy storage system (RESS) architecture for an electric vehicle.

Referring now to FIG. 1, a high voltage bus and rechargeable energy storage system (RESS) architecture 100 is shown for an electric vehicle (EV) 102. N power inverter modules (PIMs) 118-1, 118-2, . . . , and 118-P are connected between first and second conductors 119-1 and 119-2 corresponding to supply and reference potential, respectively, for a high voltage (HV) bus. The PIMs 118-1, 118-2, . . . , and 118-P supply power from a rechargeable energy storage system (RESS) 114 to electric machines (motors) 120-1, 120-2, . . . , and 120-P.

Loads 122, 126, and 130 such as coolant electric heaters (CEH), air conditioning electric compressor (ACEC), and/or auxiliary power modules (APM) are also selectively connected between the conductors 119-1 and 119-2 of the HV bus. An onboard charging module (OBCM) 134 is connected between the conductors 119-1 and 119-2 of the HV bus and to an alternating current (AC) source (e.g., such as an AC charging station. A battery disconnect unit 142 includes an array of switches (not shown) configured to disconnect a respective component from the conductors 119-1 and 119-2 of the HV bus. A direct current fast charging (DCFC) station 138 is selectively connected to the RESS 114.

As can be appreciated, the HV bus and rechargeable energy storage system (RESS) architecture 100 includes a single HV bus common to all of the components. Only one voltage level is shared by all of the components. This architecture has limited DC fast charge (DCFC) capabilities.

Figure 2A:
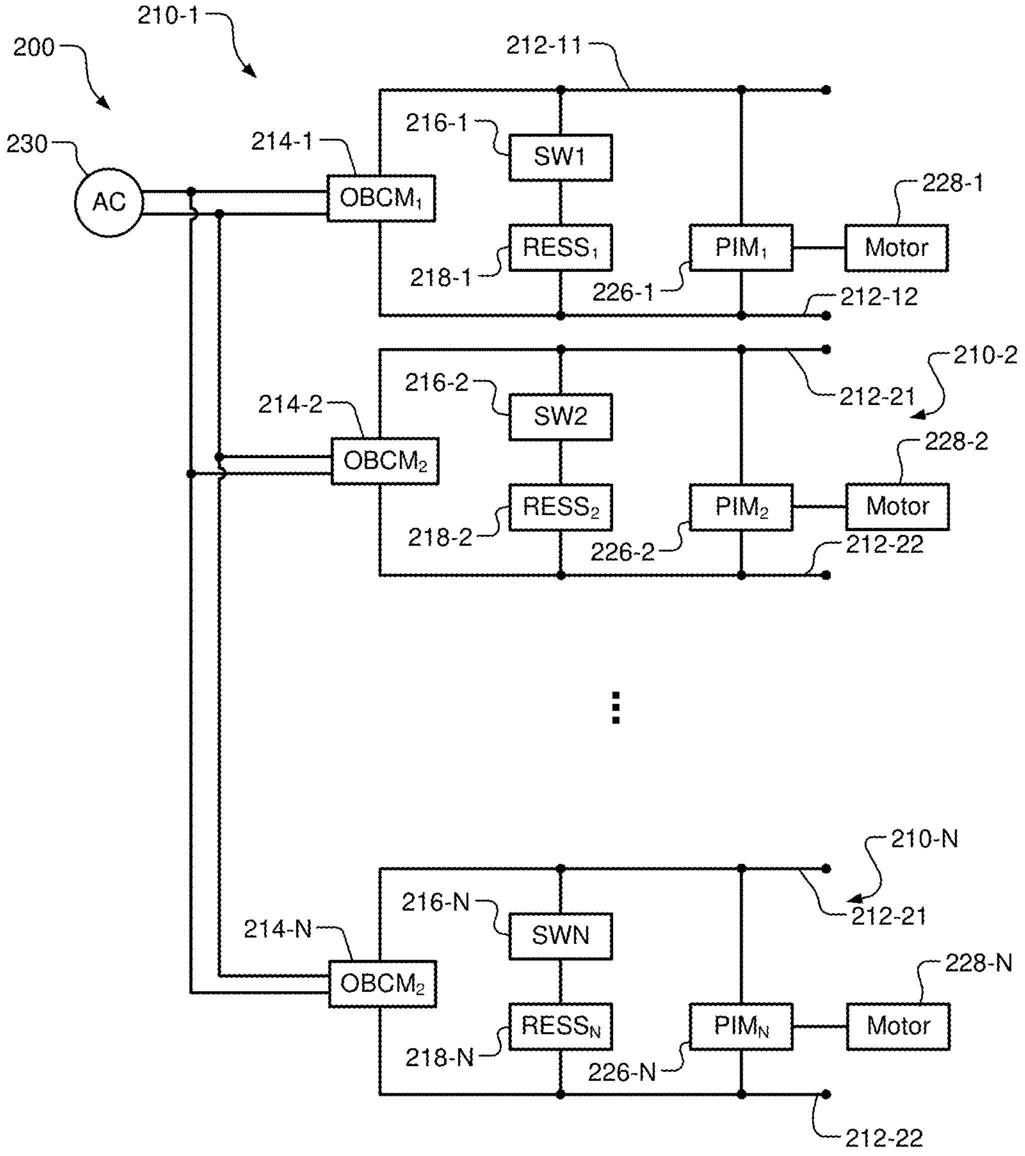
FIGS. 2A and 2B are functional block diagrams of examples of distributed high voltage bus and hybrid RESS architectures according to the present disclosure.
Figure 2B:
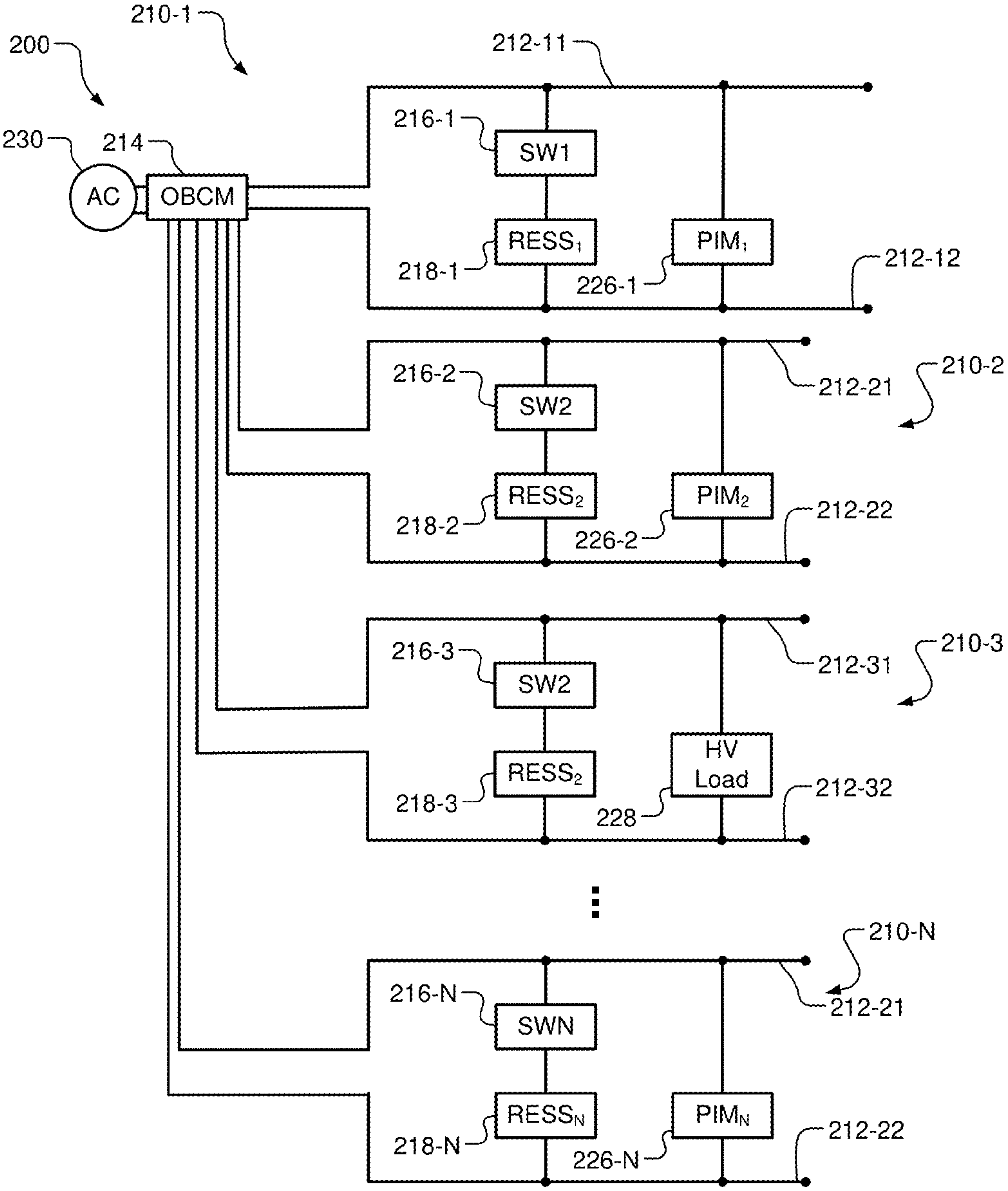

Referring now to FIGS. 2A and 2B, a distributed HV bus and hybrid RESS architecture 200 includes N HV buses 210-1, 210-2, . . . , and 210-N, where N is an integer greater than one. In FIG. 2A, a first HV bus 210-1 includes conductors 212-11 and 212-12 corresponding to supply and reference potentials, respectively. The first HV bus 210-1 includes an onboard charging module (OBCM) 214-1 connected between the conductors 212-11 and 212-12 and selectively connected to an alternating current (AC) source 230 during AC charging. In some examples, a switch SW1 is connected in series with a first RESS 218-1 between the conductors 212-11 and 212-12 to connect and disconnect the RESS 218-1.

The second HV bus 210-2 includes conductors 212-21 and 212-22 corresponding to supply and reference potentials, respectively. The second HV bus 210-2 includes an OBCM 214-2 connected between the conductors 212-21 and 212-22 and selectively connect to the AC source 230. In some examples, a switch SW2 is connected in series with a second RESS 218-2 between the conductors 212-21 and 212-22. The PIM 226-2 supplies power to one or more electric machines or motors 228-2.

The $N^{th}$ HV bus 210-N includes conductors 212-N1 and 212-N2 corresponding to supply and reference potentials, respectively. The $N^{th}$ HV bus 210-N includes an OBCM 214-N connected between the conductors 212-N1 and 212-N2. In some examples, a switch SWN is connected in series with a $N^{th}$ RESS 218-N between the conductors 212-N1 and 212-N2. The PIM 226-N supplies power to one or more electric machines or motors 228-N.

In some examples, the RESS 218-1 includes one or more battery packs, modules, and/or battery cells. In some examples, all of the RESS 218-1, 218-2, . . . , and 218-N operate at a high voltage (HV). As used herein, HV refers to voltages greater than or equal to 60V. In some examples, all of the RESS 218-1, 218-2, . . . , and 218-N operate at the same voltage (e.g., 100V, 200V, 400V, etc.). In some examples, one or more of the RESS 218-1, 218-2, . . . , and 218-N operate at a different voltage than remaining ones of the RESS 218-1, 218-2, . . . , and 218-N. In some examples, all of the RESS 218-1, 218-2, . . . , and 218-N include battery cells using the same battery chemistry. In some examples, one or more of the RESS 218-1, 218-2, . . . , and 218-N include battery cells with different chemistry than remaining ones of the RESS 218-1, 218-2, . . . , and 218-N.

The PIM 226-1 supplies power to one or more electric machines (or electric motors) 228-1. As can be appreciated, the HV buses 210-1, 210-2, . . . , and 210-N shown in FIG. 2 are merely examples for illustration purposes.

In FIG. 2B, a single OBCM 214 is shared by the HV buses 210-1, 210-2, . . . , and 210-N rather than each HV bus having a separate OBCM as in FIG. 2A. In some examples, the OBCMs are bidirectional to enable energy balancing by supplying energy from one of the RESS to the other RESS prior to DCFC. In some examples, an additional HV bus 213-3 may include a HV load 228 such as APM, ACEC, CEH, V2x, etc. instead of a PIM.

In some examples, the OBCMs are bidirectional to enable energy balancing by transferring power from one of the RESS to another one of the RESS. Bidirectional OBCMs can also be used to support vehicle to home (V2H), vehicle to vehicle (V2V), vehicle to load (V2L), and/or vehicle to anything (V2X) functionality. In other examples, the OBCMs are configured to supply power from one HV bus with a healthy RESS to the other HV buss with an unhealthy RESS.

Figure 3:
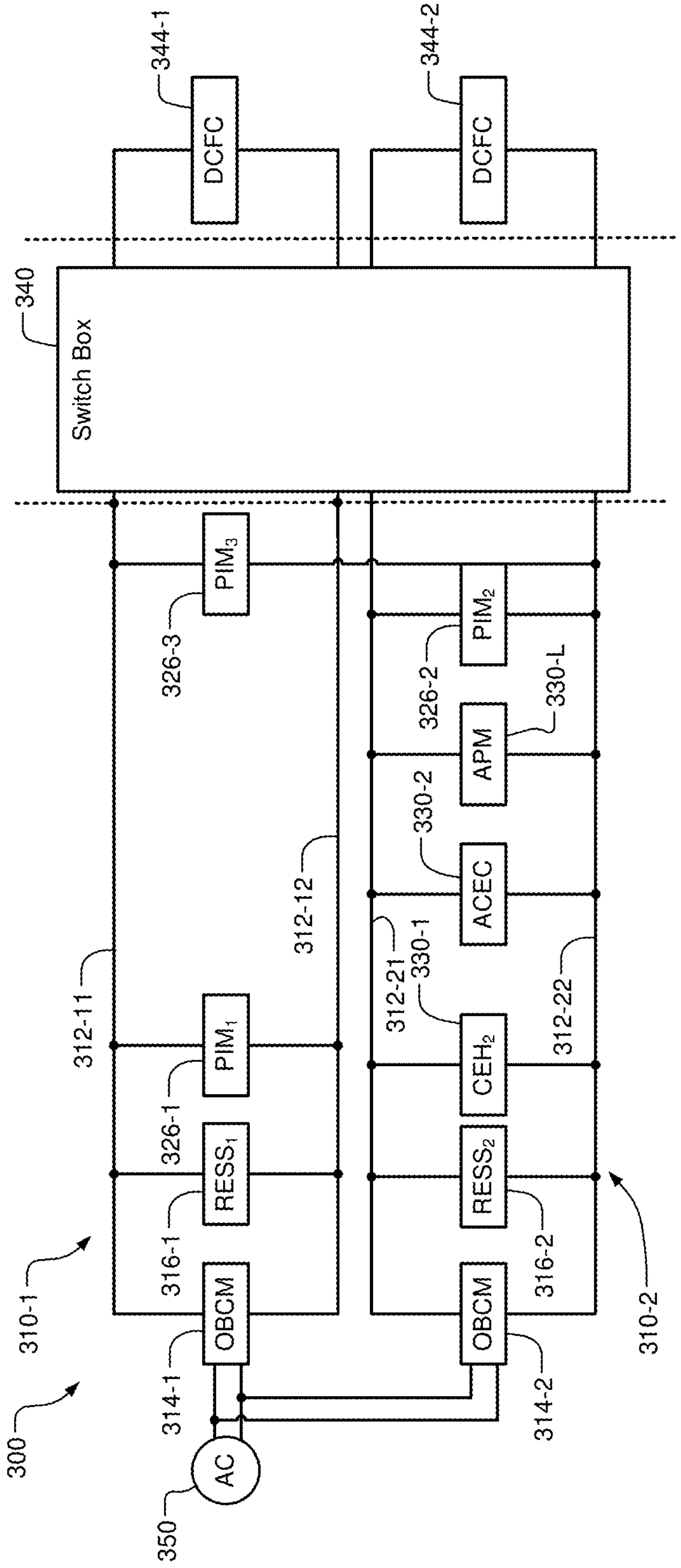
FIGS. 3 and 4 are functional block diagrams of other examples of distributed high voltage bus and hybrid RESS architectures according to the present disclosure.
Figure 4:
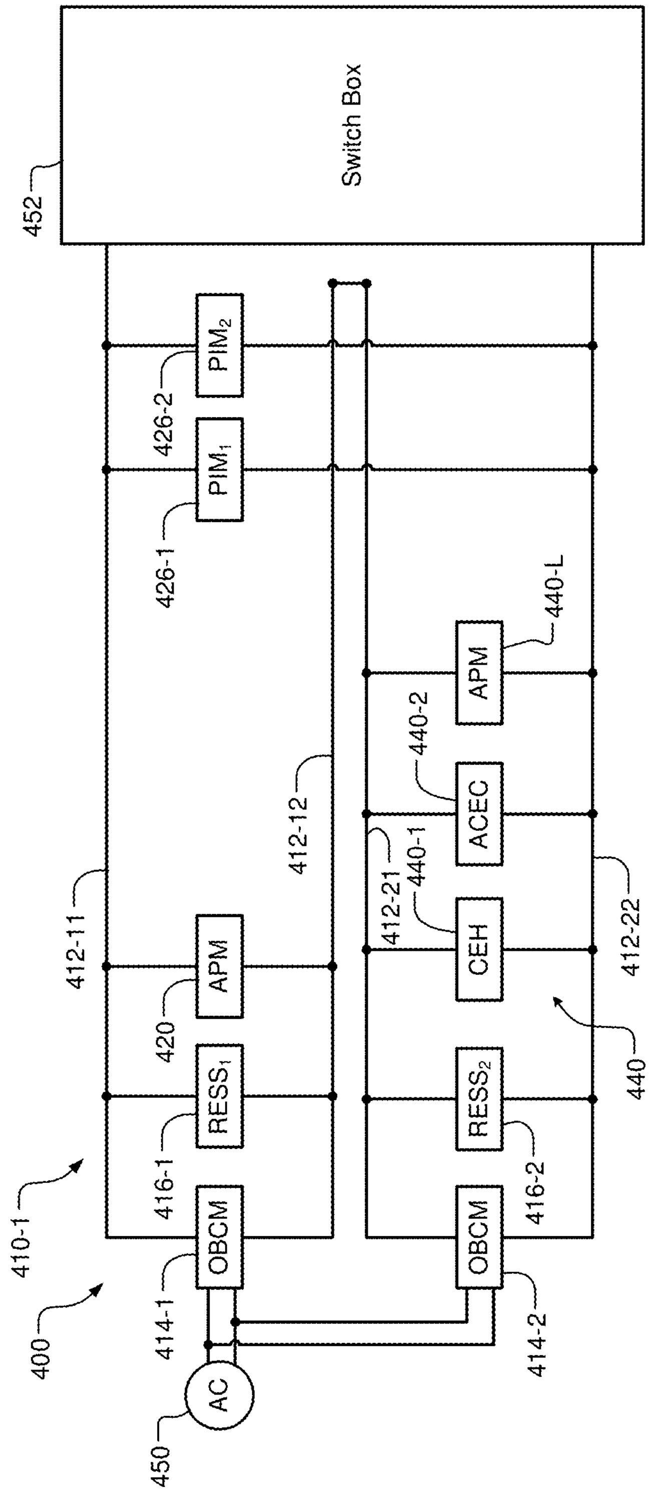

Referring now to FIGS. 3 and 4 are functional block diagrams of other examples of distributed high voltage bus and hybrid RESS architectures. In FIG. 3, a distributed high voltage bus and hybrid RESS architecture 300 includes HV buses 310-1 and 310-2. In this example, three HV buses are formed. A first HV bus is formed between first and second conductor at a voltage equal to RESS1. A second HV bus es formed between third and fourth conductor with a voltage equal to RESS2. A third HV bus is between first and fourth conductors with voltage equal to RESS1+RESS2. While three HV buses are shown, additional HV buses can be used. Furthermore, example loads are connected to one or both HV buses. However, other configurations are possible.

The HV bus 310-1 includes an OBCM 314-1 connected between supply and reference conductors 312-11 and 312-12. A RESS 316-1 is connected between the supply and reference conductors 312-11 and 312-12. A PIM 326-1 (motor not shown) is connected between the supply and reference conductors 312-11 and 312-12.

The HV bus 310-2 includes an OBCM 314-2 connected between supply and reference conductors 312-21 and 312-22. A RESS 316-2 is connected between the supply and reference conductors 312-21 and 312-22. A PIM 326-2 is connected between the supply and reference conductors 312-21 and 312-22.

In some examples, a PIM 326-3 is connected across the supply and reference conductors 312-11 and 312-22. A switch box 340 includes one or more switches that connect the conductors of the HV buses 310-1 and 310-2 in various configurations to one or more DCFC plugs (e.g., two DCFC plugs 344-1 and 344-2 are shown). While two HV buses are shown, additional HV buses can be used. As can be appreciated, each HV bus can be associated with one or more loads.

In some examples, the switch box 340 is located inside of the vehicle. In other examples, the switch box 340 is located outside of the vehicle. In some examples, the switch box 340 is modular and variations are selected to provide different functionality. The HV buses can be operated at the same or different voltage levels. By having HV buses operating at different voltage levels, the loads can be fed with an optimum voltage (to eliminate voltage range proliferation).

Providing more than one HV bus allows the battery cells, modules, or packs for each of the RESS to be packaged separately. For example, one RESS can be packaged in the front of the vehicle and the other RESS can be packaged in the rear of the vehicle. Furthermore, an individual RESS can be replaced in the event of a failure rather than replacing the RESS for the entire vehicle. In some examples, the switch box can be used to reconfigure the RESS to enable a limp home mode in the event that one or more of the RESS fail.

In some examples, the switch box 340 allows reconfiguration of the RESS in different configurations including series or parallel, multi-port charging (e.g., to double DCFC voltage) and/or charging of an individual RESS. The distributed high voltage bus and hybrid RESS architectures described herein provide increased flexibility by enabling different configurations by changing the switch box 340.

In FIG. 4, a distributed high voltage bus and hybrid RESS architecture 400 includes HV buses 410-1 and 410-2. The HV bus 410-1 includes an OBCM 414-1 connected between conductors 412-11 and 412-12 and to an AC source 450 during AC charging. A RESS 416-1 is connected between the conductors 412-11 and 412-12. An auxiliary power module (APM) 420 (e.g., supplying other loads) is connected between the conductors 412-11 and 412-12. The HV bus 410-2 includes an OBCM 414-2 connected between conductors 412-21 and 412-22. A RESS 416-2 is connected between the conductors 412-21 and 412-22. Other loads 440 (e.g., a coolant electric heater (CEH) 440-1, an air conditioning electric compressor (ACEC) 440-2, and an APM 440-L) are connected between the conductors 412-21 and 412-22.

In this example, the conductor 412-12 of the first HV bus 410-1 is connected to the conductor 412-21 of the second HV bus 410-2. PIM 426-1 and PIM 426-2 are connected between the conductors 412-11 and 412-22. A switch box 452 includes one or more switches to connect to the DCFC station in various configurations.

Figure 5A:
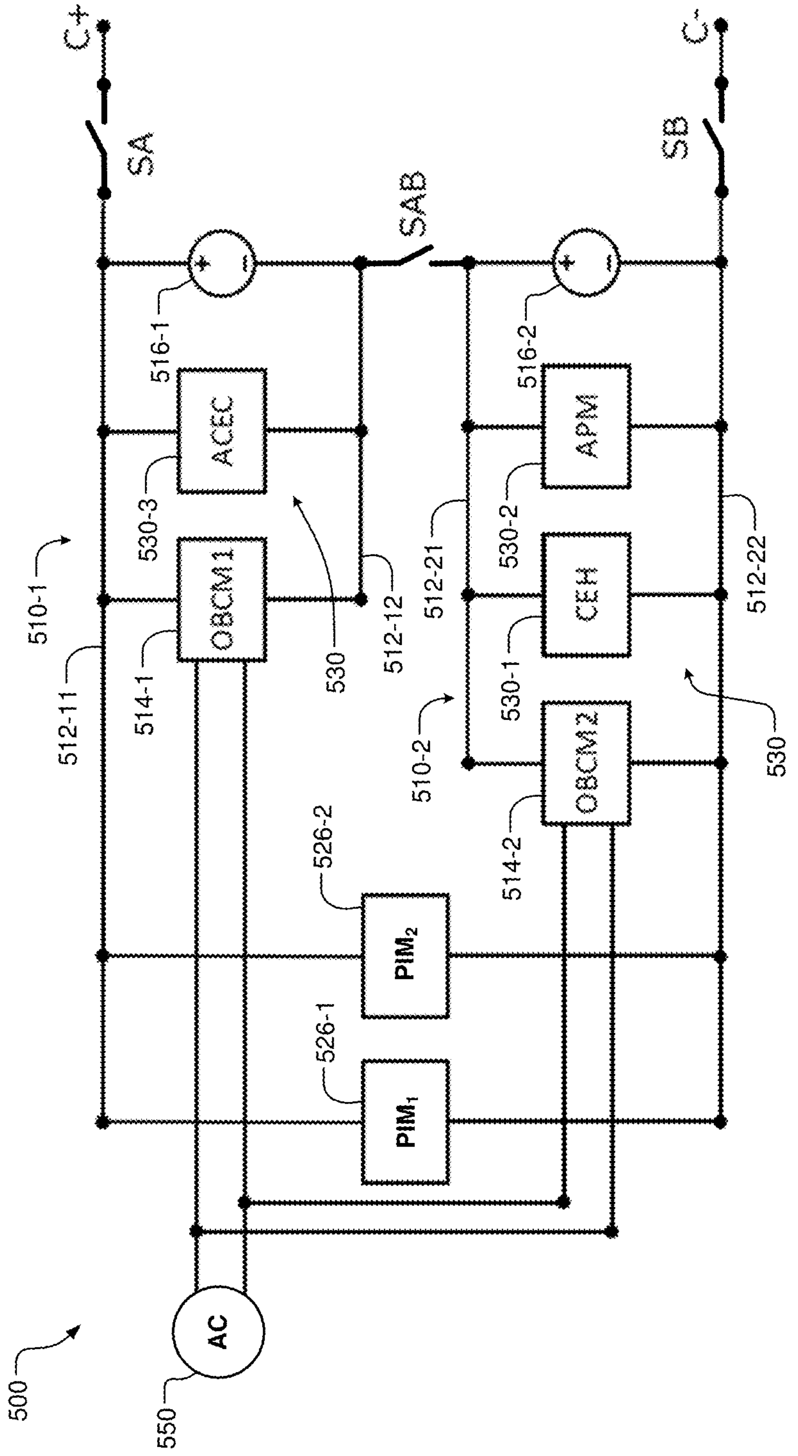
FIGS. 5A to 8 are functional block diagrams of other examples of distributed high voltage bus and hybrid RESS architectures with modular switch boxes according to the present disclosure.

Referring now to FIGS. 5A to 8 are functional block diagram of other examples of distributed high voltage bus and hybrid RESS architectures that can be paired with modular switch boxes. In FIG. 5A, the distributed high voltage bus and hybrid RESS architecture 500 includes HV buses 510-1 and 510-2. The HV bus 510-1 includes an OBCM 514-1 connected between conductors 512-11 and 512-12 and to an AC source 550 during AC charging. A RESS 516-1 is connected between the conductors 512-11 and 512-12. One or more loads 530 (e.g., an ACEC 530-3) is connected between the conductors 512-11 and 512-12.

The HV bus 510-2 includes an OBCM 514-2 connected between conductors 512-21 and 512-22. A RESS 516-2 is connected between the conductors 512-21 and 512-22. One or more loads 530 (such as a CEH 530-1 and/or an APM 530-2) is connected between the conductors 512-21 and 512-22. In some examples, PIM 526-1 and PIM 526-2 are connected between the conductors 512-11 and 512-22. A switch SA is connected between the conductor 512-11 and a DCFC terminals C+. A switch SB is connected between the conductor 512-22 and a DCFC terminals C−. A switch SAB is connected between the conductors 512-12 and 512-11.

Figure 5B:
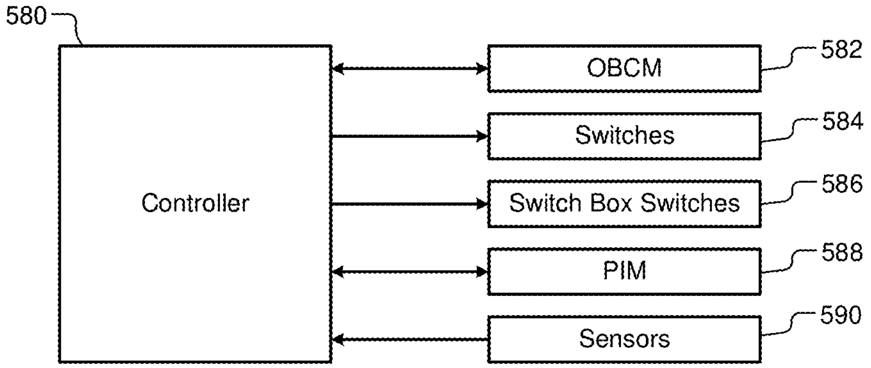
Figure 5C:
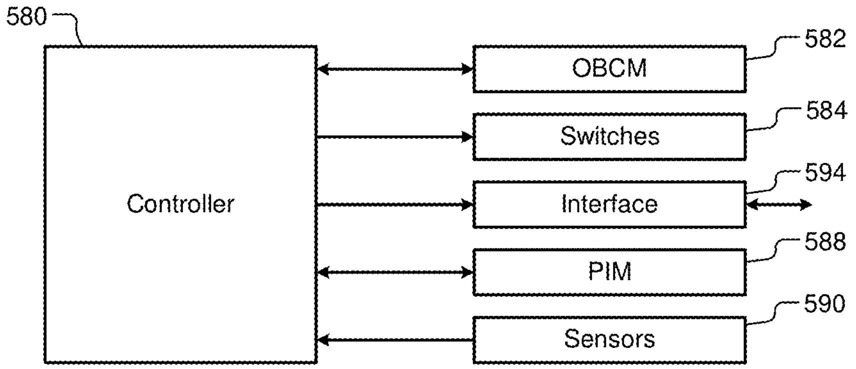

In FIG. 5B, a controller 580 is configured to control the OBCMs during AC charging, energy sharing, or energy rebalancing, the switches (e.g., switch SA, SB, and SAB described below), switches 586 in the switch box, and the PIMs 588. The controller 580 received outputs of one or more sensors 590 such as voltage and current sensors. In FIG. 5C, the controller 580 can output signals via an interface 594 to an external controller controlling the switches of the switch box in the case where the switch box is located externally. The external controller can be part of the switch box or the DCFC station.

Figure 6:
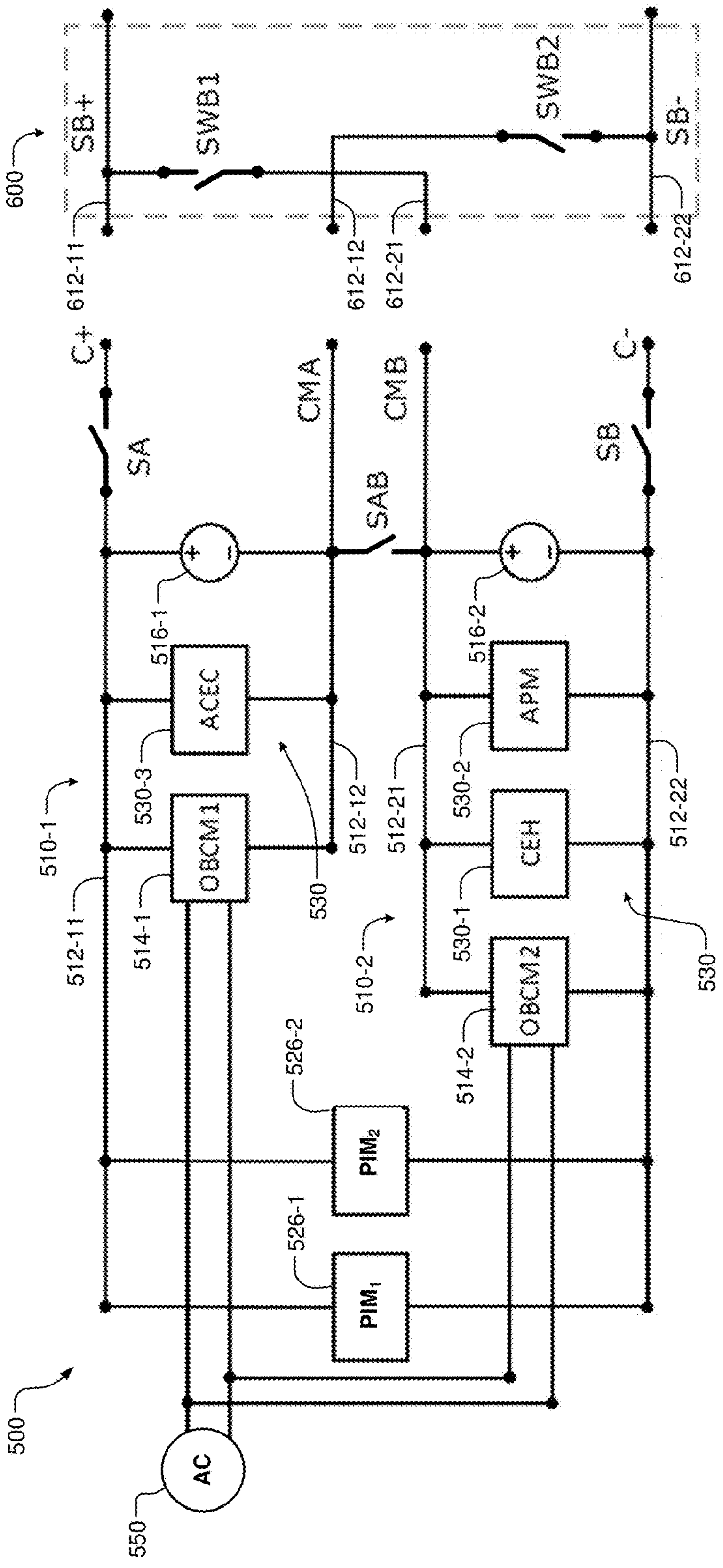
Figure 7:
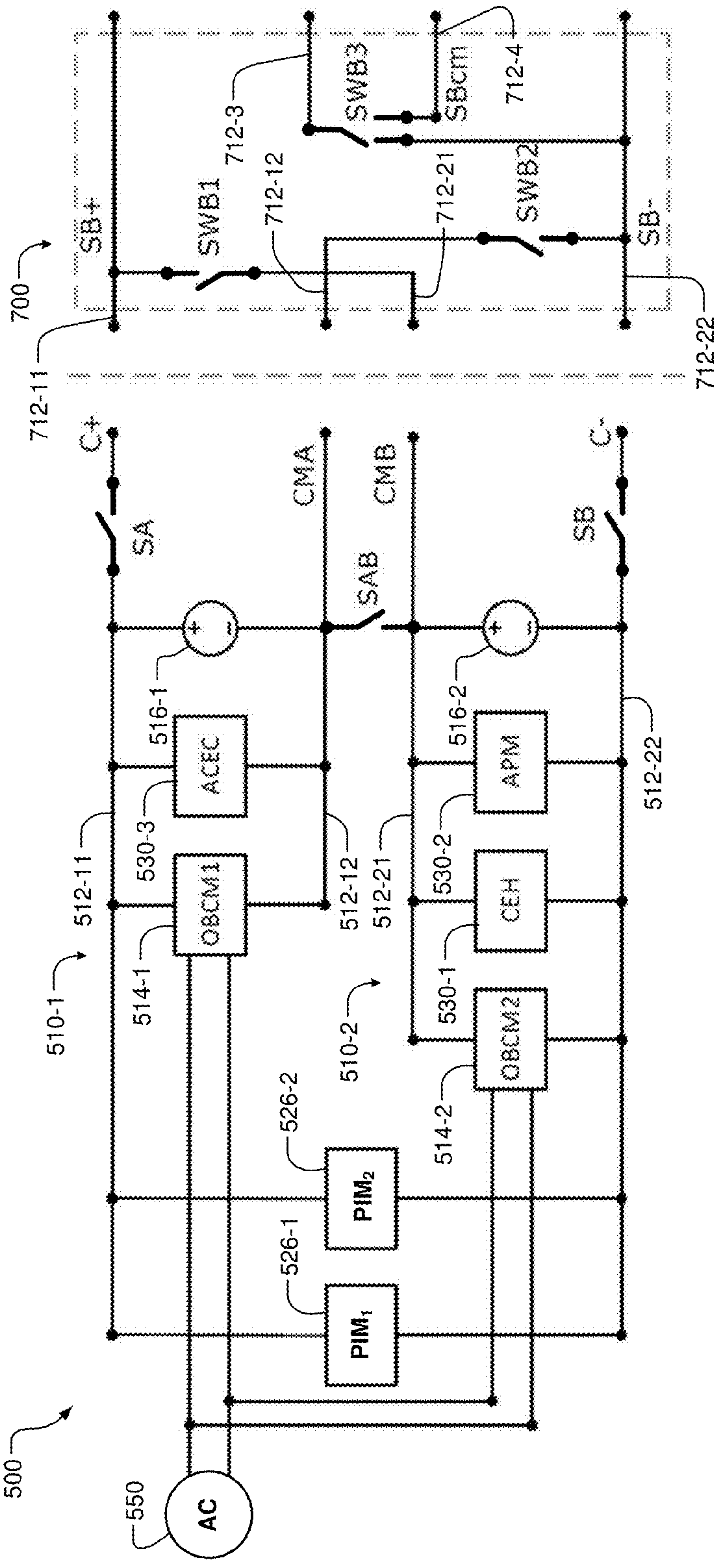
Figure 8:
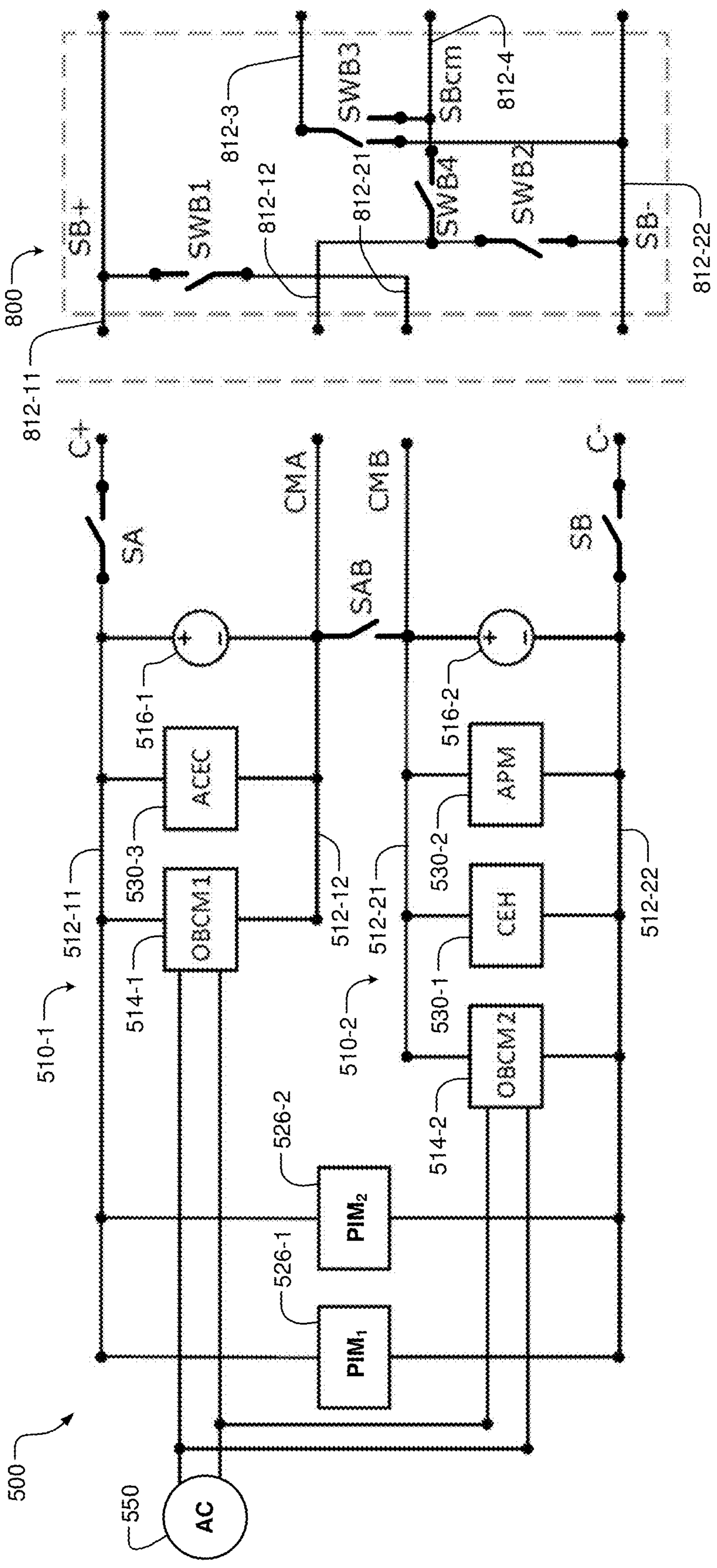

Examples of different switch boxes are shown in FIGS. 6 to 8. In FIG. 6, a switch box 600 includes conductors 612-11, 612-12, 612-21, and 612-22 that are connected to the conductors 512-11, 512-12, 512-21, and 512-22, respectively, of the HV buses 510-1 and 510-2. The conductors 612-11, 612-12, 612-21, and 612-22 are selectively connected to a DCFC station. The switch box 600 includes a switch SWB1 connected between the conductor 612-11 and 612-21 and a switch SWB2 connected between the conductor 612-12 and 612-22.

In this example, the switch box 600 provides two terminals for DCFC. The switch box 600 enables DCFC at a first voltage level (e.g., 400V). If one of the RESS is damaged, the switch box is configured to allow charging of the healthy RESS (and not the faulty RESS) by closing one of the switches SWB1 or SWB2 and opening the other one of the switches SWB2 or SWB1.

In FIG. 7, a switch box 700 includes conductors 712-11, 712-12, 712-21, and 712-22 that are connected to the conductors 512-11, 512-12, 512-21, and 512-22, respectively, of the HV buses 510-1 and 510-2. The switch box 700 includes a switch SWB1 connected between the conductor 712-11 and 712-21 A switch SWB2 is connected between the conductor 712-12 and 712-22. A switch SWB3 comprises a single pull double throw (SPDT) switch that selectively connects a conductor 712-3 to the conductor 712-22 or a conductor 712-4. The conductors 712-11, 712-3, 712-4, and 712-22 are selectively connected to a DCFC station.

In this example, the switch box 700 provides four terminals for DCFC. The switch box 700 can be configured as in FIG. 6 or to enable two port DCFC, which is the fastest charging approach currently available.

In FIG. 8, a switch box 800 includes conductors 812-11, 812-12, 812-21, and 812-22 that are connected to the conductors 512-11, 512-12, 512-21, and 512-22, respectively, of the HV buses 510-1 and 510-2. The switch box 800 includes a switch SWB1 connected between the conductor 812-11 and 812-21 A switch SWB2 is connected between the conductor 812-12 and 812-22. A switch SWB4 selectively connects a conductor 812-4 to the conductor 812-12. A switch SB3 selectively connects the conductor 812-3 to the conductor 812-22 or the conductor 812-4. The conductors 812-11, 812-3, 812-4, and 812-22 are selectively connected to a DCFC station.

In this example, the switch box 800 provides four terminals for DCFC. The switch box 700 can be configured as in FIG. 6, two port DCFC, or charging each RESS with a dedicated port without requiring energy balancing prior to charging.

Referring back to FIG. 5, the switches SA and SB can be opened and the switch SAB can be closed to connect both RESS in series across the PIMs (e.g., 800V or another voltage level) while powering loads with one of the RESS (e.g., 400V or another voltage level).

The switches SA, SB, and SAB can be closed for charging at a DCFC at 800V. Prior to DCFC, energy (or state of charge (SOC)) balancing can be performed between two or more RESS prior to DCFC with energy sharing through the bidirectional OBCMs. This approach can be used by customers prior to a longer trip. If pre-balancing is not performed, the SOC of one RESS can be different than the other RESS after charging. Most customers use DCFC charge to 80% SOC and therefore there is low impact to customer satisfaction. If a higher SOC is desired, OBCM energy balancing can be performed or energy balancing can be performed through the switch box. However, the total charge time including energy balancing will be longer than usual.

The switches SA and SB can be closed and the switch SAB can be opened to charge both RESS at a lower DCFC voltage equal to the RESS voltage (e.g., 400V or another voltage level). The switch boxes 600, 700, and 800 in FIGS. 6 to 8, respectively, can be configured in a similar way.

Referring back to FIG. 6, either the switch SA or SB is closed and SAB is opened and the switch box 600 is configured to connect the DCFC to one of the RESS. For example, switch SA is opened, switch SAB is opened, switch SB is closed, SWB1 is closed, and SWB2 is opened to charge RESS 516-2. For example, switch SA is closed, switch SAB is opened, switch SB is opened, SWB1 is opened, and SWB2 is closed to charge RESS 516-1. The switch boxes 700 and 800 in FIGS. 7 and 8, respectively, can be configured in a similar way.

Referring back to FIG. 7, two port DCFC can be performed by closing switches SA, SB, and SAB, opening switches SWB1 and SWB2, and configuring switch SWB3 to connect the conductor 712-3 to the conductor 712-4. The switch box 800 can be configured in a similar way.

Referring back to FIG. 8, two port charging with separate connections to the RESS can be performed by closing switches SA, SB, and SAB, opening switches SWB1 and SWB2, and configuring switch SWB3 to connect the conductor 812-3 to the conductor 812-4.

As can be appreciated, while specific examples of HV loads are shown, other HV loads can be used. In some examples, the AC source can be replaced by a load and power can be supplied using the OBCMs to an external load.

Figure 9:
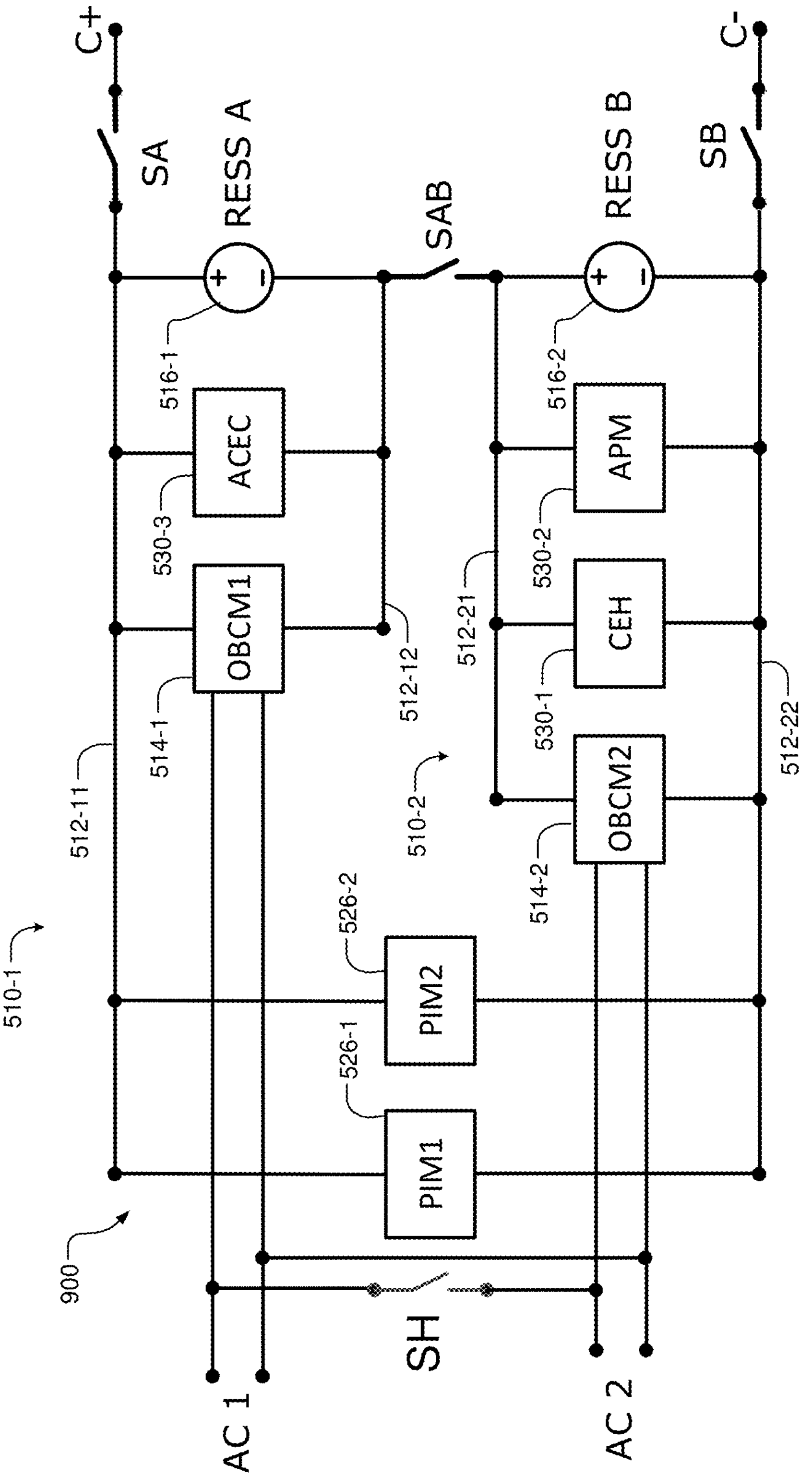
FIG. 9 is a functional block diagram of a distributed high voltage bus and hybrid RESS architecture for distributed home charging according to the present disclosure.

Referring now to FIG. 9, a distributed high voltage bus and hybrid RESS architecture 900 is shown for distributed home charging. A switch SH is ON when only one AC port or during energy sharing between the multiple busses. The switch SH is OFF when charging through multiple AC ports.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or J SON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:

Hypertext Preprocessor), Scala, Eiffel, Smalltalk, Erlang, Ruby, Flash®, Visual Basic®, Lua, MATLAB, SIMULINK, and Python®.

What is claimed is:

1. A distributed high voltage (HV) bus and hybrid rechargeable energy storage (RESS) system comprising:
- a first HV bus including first and second conductors, a first rechargeable energy storage system (RESS) connected between the first and second conductors, and a first load connected between the first and second conductors;
- a second HV bus including third and fourth conductors, a second RESS connected between the third and fourth conductors, and a second load connected between the third and fourth conductors; and
- an onboard charging module (OBCM) configured to at least one of charge at least one of the first RESS and the second RESS using an alternating current (AC) source and supply power from at least one of the first RESS and the second RESS to an external load;
- a first power inverter module (PIMS) connected between the first and second conductors and configured to output power from at least one of the first and second RESS to at least one of M electric motors where M is an integer greater than zero; and
- a second PIMS connected between the third and fourth conductors and configured to output power from at least one of the first and second RESS to the at least one of M electric motors.

2. The distributed high voltage bus and hybrid RESS system of claim 1, further comprising:
- a first switch connected in series with the first conductor;
- a second switch connected between the second conductor and the third conductor; and
- a third switch connected in series with the fourth conductor.

3. The distributed high voltage bus and hybrid RESS system of claim 1, further comprising a switch box including a plurality of switches configured to connect at least one of the first RESS and the second RESS with a direct current fast charging (DCFC) station.

4. The distributed high voltage bus and hybrid RESS system of claim 1, wherein the first RESS operates at a different voltage than the second RESS.

5. The distributed high voltage bus and hybrid RESS system of claim 1, wherein the first RESS operates includes battery cells using a different chemistry than battery cells of the second RESS.

6. The distributed high voltage bus and hybrid RESS system of claim 1, wherein at least one of the first load and the second load are selected from a group consisting of an air conditioning (AC) electric compressor (ACEC), an electric heater and an auxiliary power module (APM).

7. The distributed high voltage bus and hybrid RESS system of claim 1, further comprising:
- a switch connected between the first conductor and the third conductor; and
- a fifth conductor connecting the second conductor to the fourth conductor,
- wherein the OBCM includes a first OBCM configured to supply power from the first RESS to a first external load, and
- wherein the OBCM includes a second OBCM configured to supply power from the second RESS to at least one of the first external load and a second external load using the AC source.

8. The distributed high voltage bus and hybrid RESS system of claim 3, wherein the switch box is located in a vehicle.

9. The distributed high voltage bus and hybrid RESS system of claim 3, wherein the switch box is located outside of a vehicle.

10. The distributed high voltage bus and hybrid RESS system of claim 1, wherein the OBCM includes:
- a first OBCM configured to charge the first RESS using the AC source; and
- a second OBCM configured to charge the second RESS using the AC source.

11. The distributed high voltage bus and hybrid RESS system of claim 10, wherein:
- the first OBCM is selectively configured to supply power from the first RESS to the second HV bus, and
- the OBCM includes a second OBCM selectively configured to supply power from the first RESS to the second HV bus.

12. The distributed high voltage bus and hybrid RESS system of claim 3, wherein:
- the onboard charging module (OBCM) includes a first OBCM configured to charge the first RESS and a second OBCM configured to charge the second RESS using the AC source,
- wherein the first OBCM and the second OBCM are bidirectional and are configured to rebalance energy stored in the first RESS and the second RESS at least one of prior to or during DCFC at the DCFC station.

13. A distributed high voltage (HV) bus and hybrid rechargeable energy storage device (RESS) system comprising:
- a first HV bus comprising first and second conductors, a first rechargeable energy storage system (RESS) connected between the first and second conductors, and a first load connected between the first and second conductors;
- a second HV bus comprising third and fourth conductors, a second RESS connected between the third and fourth conductors, and a second load connected between the third and fourth conductors, wherein the first RESS operates at a different voltage than the second RESS; and
- an onboard charging module (OBCM) configured to charge the first RESS and the second RESS using an alternating current (AC) source; and
- a first power inverter module (PIMS) configured to output power from at least one of the first and second RESS to a first motor;
- a second power inverter module (PIMS) configured to output power from at least one of the first and second RESS to a second motor;
- a first switch connected in series with the first conductor;
- a second switch connected between the second conductor and the third conductor; and
- a third switch connected in series with the fourth conductor
- wherein the OBCM includes a first OBCM configured to at least one of charge the first RESS using a first AC source and supply power from the first RESS to a first external load and a second OBCM configured to at least one of charge the second RESS using at least one of the first AC source and a second AC source and supply power from the second RESS to at least one of the first external load and a second external load.

14. The distributed high voltage bus and hybrid RESS system of claim 13, further comprising a switch box including a plurality of switches configured to connect at least one of the first RESS and the second RESS to a direct current fast charging (DCFC) station.

15. The distributed high voltage bus and hybrid RESS system of claim 13, wherein the first RESS includes battery cells using a different chemistry than battery cells of the second RESS.

16. The distributed high voltage bus and hybrid RESS system of claim 13, wherein at least one of the first load and the second load includes a load selected from a group consisting of an air conditioning (AC) electric compressor (ACEC), an electric heater, and an auxiliary power module (APM).

17. The distributed high voltage bus and hybrid RESS system of claim 14, wherein the switch box is located in a vehicle.

18. The distributed high voltage bus and hybrid RESS system of claim 14, wherein the switch box is located outside of a vehicle.

19. A vehicle comprising:

M electric motors, where M is an integer greater than zero; and a distributed high voltage bus and hybrid rechargeable energy storage device (RESS) system comprising:

a first HV bus comprising first and second conductors, a first rechargeable energy storage system (RESS) connected between the first and second conductors, and a first load connected between the first and second conductors;

a second HV bus comprising third and fourth conductors, a second RESS connected between the third and fourth conductors, and a second load connected between the third and fourth conductors, wherein the first RESS operates at a different voltage than the second RESS;

an onboard charging module (OBCM) configured to charge the first RESS and the second RESS using an alternating current (AC) source; and a first power inverter module (PIMS) configured to output power from at least one of the first and second RESS to one of the M electric motors;

a second power inverter module (PIMS) configured to output power from at least one of the first and second RESS to one of the M electric motors;

a first switch connected in series with the first conductor;

a second switch connected between the second conductor and the third conductor; and a third switch connected in series with the fourth conductor; and a switch box including a plurality of switches configured to connect at least one of the first RESS and the second RESS to a direct current fast charging (DCFC) station.

* * * * *